US012123369B2

(12) United States Patent
Zhu et al.

(10) Patent No.: US 12,123,369 B2
(45) Date of Patent: Oct. 22, 2024

(54) ACTIVE METHOD FOR COLD START EMISSIONS REDUCTION (71) Applicants: Hyundai Motor Company, Seoul (KR); Kia Corporation, Seoul (KR)

(72) Inventors: Shengrong Zhu, Ann Arbor, MI (US); Jeffrey Hollowell, Commerce, MI (US); Kyoung Pyo Ha, Gyeonggi-do (KR); Mark Shirley, Albion, MI (US); Nicholas Fantin, Ann Arbor, MI (US)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/107,352

(22) Filed: Feb. 8, 2023

(65) Prior Publication Data
US 2024/0263597 A1  Aug. 8, 2024

(51) Int. Cl.
F02D 41/40 (2006.01)
F01L 1/26 (2006.01)
F01L 9/40 (2021.01)
F02D 13/02 (2006.01)
F02D 41/02 (2006.01)

(52) U.S. Cl.
CPC ............ F02D 41/402 (2013.01); F01L 1/267 (2013.01); F01L 9/40 (2021.01); F02D 13/0203 (2013.01); F02D 13/0265 (2013.01); F02D 41/0255 (2013.01); F01L 2009/4084 (2021.01)

(58) Field of Classification Search
CPC .. F02D 13/0265; F02D 13/0203; F01L 1/267; F01L 9/40
See application file for complete search history.

(56) References Cited

U.S. PATENT DOCUMENTS

| 9,382,857 | B2 | 7/2016 | Glugla et al. |
| 9,988,999 | B2 | 6/2018 | Ancimer et al. |
| 2004/0098970 | A1 | 5/2004 | Foster |
| 2014/0238318 | A1 | 8/2014 | Zhang |
| 2019/0178115 | A1 | 6/2019 | Son et al. |

FOREIGN PATENT DOCUMENTS

| CN | 112277920 A | * | 1/2021 | .......... B60W 10/023 |
| DE | 112006001046 B4 | * | 9/2018 | ............. F01L 13/00 |

* cited by examiner

Primary Examiner — Ngoc T Nguyen
(74) Attorney, Agent, or Firm — Fox Rothschild LLP (57) ABSTRACT An internal combustion engine system and methods of use are provided. The internal combustion engine system may comprise an engine chamber with a piston, and one or more of the following, configured to enable a negative valve overlap (NVO) mode of operation in which an intake valve opening (IVO) timing is later than an exhaust valve closing (EVC) timing: a continuously variable valve duration (CVVD) mechanism for both an intake valve and an exhaust valve; a dual CVVD and continuously variable valve timing (CVVT) mechanism for both the intake valve and the exhaust valve; and a cam system. The internal combustion system may comprise a fuel delivery system comprising one or more of a direct injector and a port fuel injector; and may comprise an ignition system.

12 Claims, 5 Drawing Sheets

ACTIVE METHOD FOR COLD START EMISSIONS REDUCTION

BACKGROUND

Technical Field

Embodiments of the present disclosure relate to systems and methods for reducing engine-out emissions during an engine cold start.

Background

In order to curb pollution caused by vehicle emissions, vehicle emissions regulations have become and continue to be more and more stringent. For example, the acceptable levels of NMOG+NOx, the combination of the emissions of nonmethane organic gases (NMOG) and nitrogen oxides (NOx), has steadily decreased for each new model year of vehicle, with the ongoing proposal in Europe for the Euro7 (2025) regulation including even stricter emissions standards.

Vehicle emissions reduction heavily relies on an aftertreatment system, catalytic converter. The catalytic converter is configured to convert unburnt hydrocarbon (HC), CO, and NOx into non-harmful gases such as, e.g., $H_2O$, $CO_2$, and $N_2$. The catalytic converter can very effectively convert emissions with a conversion rate of 99% or above, at its normal operating temperature. However, catalytic converters are only effective after a catalytic brick reaches a relatively high temperature (e.g., approximately 250-350° C. of a typical light-off temperature at which the emission conversion efficiency is 50%).

Due to the light-off temperature requirement of the catalytic converter, the emissions from an engine cold-start period and an engine warm-up period contribute significant portions of a vehicle's overall emissions.

Multiple methods exist for attempting to heat up the catalytic converter faster.

By way of example, a method may comprise incorporating elevated idle speed or/and significantly delay combustion phasing to increase exhaust gas temperature for beating up the catalyst faster. However, under this method combustion stability is compromised, increasing the tendency for misfire, potentially affecting noise, vibration, and harshness (NHV) issues, etc. Additionally, during this method, before the catalytic brick reaches its light-off temperature, the engine-out emissions are still high.

By way of example, a method may comprise opening the exhaust valve to increase exhaust gas temperature. However, during this method, before the catalytic brick reaches its light-off temperature, the engine-out emissions are still high.

By way of example, a method may comprise incorporating a small catalytic converter and a main catalytic converter. However, while the small catalytic converter may be installed very closed to an exhaust port, reducing thermal mass and a thermal path for faster catalytic brick heat-up, during this method, before the catalytic brick reaches its light-off temperature, the engine-out emissions are still high.

By way of example, a method may comprise electrically heating the catalytic converter. However, this requires an additional electrical heating device, additional power to run the additional electric heating device, and during this method, before the catalytic brick reaches its light-off temperature, the engine-out emissions are still high.

By way of example, a method may comprise incorporating cylinder de-activation technology (or dynamic skip fire technology) configured to cause some of the cylinders (e.g., 2 out of 4, for a 4 cylinder engine) to operate at a relatively higher load to increase combustion temperatures for reducing HC and CO (particulate mater (PM) emissions). However, during this method, NOx emissions increase due to the higher combustion temperature, and there may be potential torque oscillation issues, requiring some mitigation measures, requiring either a passive or active device, such as, e.g., flywheel dampers, electric motors, etc.

By way of example, a method may comprise incorporating a fuel rich operation with the addition of a secondary air injection (SAI) in the exhaust, to heat up the catalyst faster. However, during this method, combustion efficiency is worsened, an additional air injection line is needed, it is challenging to locate an optimum position to introduce the SAI, and, before the catalytic brick reaches its light-off temperature, the engine-out emissions are still high.

By way of example, a method may comprise incorporating an electrified dynamic skip fire (eDSF) in addition to a dynamic air pump. However, during this method, an electric motor is needed to replace the missing sinusoidal torque pulses of the skipped cylinders, the NOx emissions are still high due to higher combustion temperature, and, before the catalytic brick reaches its light-off temperature, the engine-out emissions are still high.

For at least these reasons, systems and methods for reducing engine-out emissions during an engine cold start are needed.

SUMMARY

According to an object of the present disclosure, an internal combustion engine system is provided. The internal combustion engine system may comprise an engine chamber with a piston, and one or more of the following, configured to enable a negative valve overlap (NVO) mode of operation in which an intake valve opening (IVO) timing is later than an exhaust valve closing (EVC) timing: a continuously variable valve duration (CVVD) mechanism for both an intake valve and an exhaust valve; a dual CVVD and continuously variable valve timing (CVVT) mechanism for both the intake valve and the exhaust valve; and a cam system. The internal combustion system may comprise a fuel delivery system comprising one or more of a direct injector and a port fuel injector; and may comprise an ignition system.

According to an exemplary embodiment, the internal combustion engine may comprise one or more aftertreatment monitoring systems.

According to an exemplary embodiment, the one or more aftertreatment monitoring systems may comprise one or more catalytic brick temperature monitoring systems.

According to an exemplary embodiment, the internal combustion engine system may comprise one or more engine coolant temperature sensors and one or more water jackets.

According to an exemplary embodiment, the one or more engine coolant temperature sensors may be coupled to the one or more water jackets.

According to an exemplary embodiment, the internal engine combustion system may comprise an engine controller configured to control one or more functions of the internal combustion engine system.

According to an object of the present disclosure, a method of reducing engine cold start emissions is provided. The method may comprise, during an engine cranking period, performing an NVO mode of operation, using an early EVC timing that creates an NVO during a gas exchange top dead center, to compress in-cylinder gas and increase overall gas temperature for improved fuel vaporization before a fuel-air mixture is burnt.

According to an exemplary embodiment, the method may comprise, during an engine stabilization period, performing the NVO mode of operation, using the early EVC timing that creates the NVO during the gas exchange top dead center, to trap hot burnt gas in a cylinder and increase overall gas temperature for improved fuel vaporization before the fuel-air mixture is burnt.

According to an exemplary embodiment, the method may comprise, during an engine warm-up period, performing the NVO mode of operation, using the early EVC timing that creates the NVO during the gas exchange top dead center, to trap hot burnt gas in the cylinder and increase overall gas temperature for improved fuel vaporization before the fuel-air mixture is burnt.

According to an exemplary embodiment, during the engine warm-up period, performing the NVO mode of operation may comprise using a globally lean fuel-air ratio.

According to an exemplary embodiment, during the engine warm-up period, performing the NVO mode of operation may comprise using a stoichiometric fuel-air ratio.

According to an object of the present disclosure, a system of reducing engine cold start emissions is provided. The system may comprise an internal combustion engine system. The internal combustion engine system may comprise an engine chamber with a piston, and one or more of the following, configured to enable an NVO mode of operation in which an IVO timing is later than an EVC timing: a CVVD mechanism for both an intake valve and an exhaust valve; a dual CVVD and CVVT mechanism for both the intake valve and the exhaust valve; and a cam system. The internal combustion system may comprise a fuel delivery system comprising one or more of a direct injector and a port fuel injector; and may comprise an ignition system. The system may comprise a computing device, comprising a processor and a memory, configured to store programming instructions. The programming instructions, when executed by the processor, may be configured to cause the processor to perform the NVO mode of operation, with an NVO during a gas exchange top dead center, to trap hot burnt gas in a cylinder and increase overall gas temperature for improved fuel vaporization before a fuel-air mixture is burnt, and perform one or more of: a double fuel injection with a first fuel injection and a second fuel injection being performed during the NVO mode of operation; a double fuel injection with the first injection taking place during the NVO mode of operation and the second fuel injection taking place after an IVO timing is later than the EVC timing; and a triple fuel injection, with the first fuel injection taking place during the NVO mode of operation, the second fuel injection taking place before firing Top Dead Center (TDCf), and the third fuel injection taking place after TDCf.

According to an exemplary embodiment, the internal combustion engine system may further comprise one or more aftertreatment monitoring systems.

According to an exemplary embodiment, the one or more aftertreatment monitoring systems may comprise one or more catalytic brick temperature monitoring systems.

According to an exemplary embodiment, the internal combustion engine system may further comprise one or more engine coolant temperature sensors and one or more water jackets.

According to an exemplary embodiment, the one or more engine coolant temperature sensors may be coupled to the one or more water jackets.

According to an exemplary embodiment, the internal combustion engine system may further comprise an engine controller configured to control one or more functions of the internal combustion engine system.

According to an exemplary embodiment, the programming instructions, when executed by the processor, may be configured to cause the engine controller to control the one or more functions of the internal combustion engine system.

In a further aspect, vehicles are provided that comprise methods and system as disclosed herein.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor." as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

A gasoline direct injection (GDI) engine, during a cold start, may leave approximately 30% of fuel unburnt, with approximately 8% in the gaseous phase and approximately 22% in the liquid phase, as a wall film. A challenge with existing engines is, during an engine cold start, balancing combustion stability and emissions with exhaust heat. Embodiments described herein provide systems and methods for reducing engine-out emissions during an engine cold start are provided.

Figure 1:
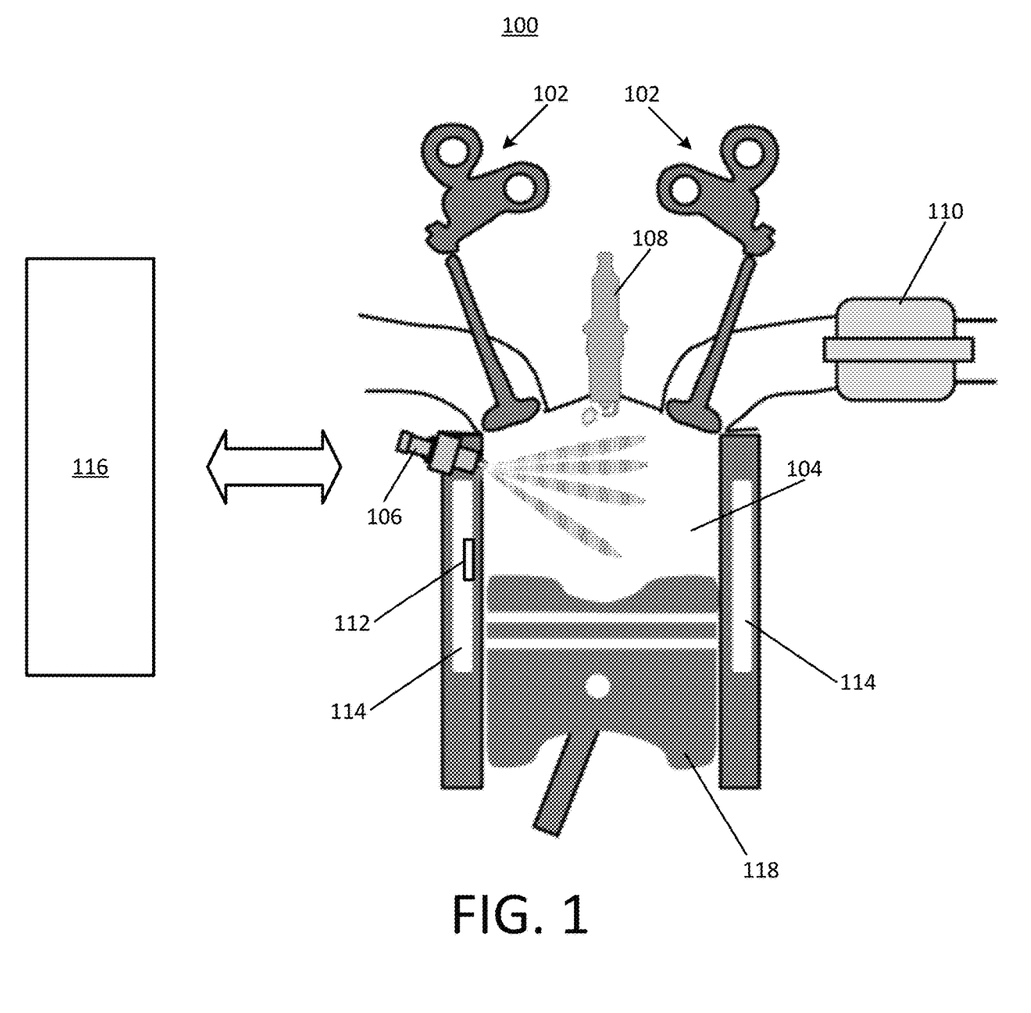
FIG. 1 illustrates an engine system configured to reduce engine-out emissions during an engine cold start, according to an exemplary embodiment of the present disclosure.

Referring now to FIG. 1, an engine system 100 configured to reduce engine-out emissions during an engine cold start is illustratively depicted, in accordance with an exemplary embodiment of the present disclosure.

According to an exemplary embodiment, the engine system 100 may comprise one or more dual continuously variable valve duration (CVVD) and continuously variable valve timing (CVVT) mechanisms 102 for the intake and exhaust valve systems. According to an exemplary embodiment, a CVVD mechanism may configured to continuously vary a duration that an intake and/or exhaust valve remains open during one or more open-close cycles. According to an exemplary embodiment, a CVVT mechanism may configured to continuously vary the timing of when an intake and/or exhaust valve opens during one or more open-close cycles.

The engine system 100 may be an internal combustion engine system. According to an exemplary embodiment, the engine system 100 may comprise one or more combustion chambers 104, one or more pistons 118, one or more fuel delivery systems 106 (e.g., GDI systems and/or other suitable fuel delivery systems), one or more ignition systems 108, one or more aftertreatment monitoring systems 110 (e.g., one or more catalytic brick temperature monitoring systems and/or one or more other suitable aftertreatment monitoring systems), one or more engine coolant temperature sensors 112, and/or one or more water jackets 114, among other suitable components. According to an exemplary embodiment, the one or more engine coolant temperature sensors 112 may be coupled to one or more water jackets 114.

According to an exemplary embodiment, the engine system 100 may comprise an engine controller 116 configured to control one or more components and/or functions of the engine system 100. According to an exemplary embodiment, the engine controller 116 may be in electronic communication with one or more components of the engine system 100. The engine controller 116 may be in electronic communication with the one or more components of the engine system 100 via a wired and/or wireless connection such as, for example, through the cloud.

According to an exemplary embodiment, to start the engine system 100, a negative valve overlap (NVO) mode of operation may be used with a preset amount to compress air during a gas exchange top dead center (TDC_gx), a double fuel injection may be performed with one fuel injection occurring during the NVO mode and the other fuel injection occurring after an intake valve open (IVO) event, and an ignition source (e.g., a spark plug and/or other suitable ignition source) may be implemented in order to initiate the combustion of a fuel-air mixture.

According to an exemplary embodiment, the engine system 100 may be configured such that the dual CVVD and CVVT mechanism may be used for intake and/or exhaust valve systems and, using an NVO mode enabled by the CVVD and CVVT mechanism, an increase in-cylinder gas temperature before combustion may be achieved, actively improving fuel vaporization and combustion, and reducing emissions.

According to an exemplary embodiment, the NVO amount may be an intake valve open (IVO) timing amount subtracted by an exhaust vehicle close (EVC) timing amount. Additionally, according to an exemplary embodiment, a positive valve overlap (PVO) amount may be an EVC timing amount subtracted by an IVO timing amount.

According to an exemplary embodiment, during the warm-up period after the engine system 100 is started, the NVO may continue to be used to trap the combusted hot gases in the cylinders of the engine system 100. According to an exemplary embodiment, using the NVO to trap the combusted hot gases in the cylinders of the engine system 100 may increase an overall gas temperature and improve fuel vaporization before the fuel-air mixture is burnt, resulting in higher combustion efficiency and fewer emissions (e.g., HC and soot). According to an exemplary embodiment, using the NVO to trap the combusted hot gases in the cylinders of the engine system 100 may accelerate the warm-up process for the combustion components as head, liner, and piston, etc., by providing an additional heating/heat transfer chance and combusted gas recompression during the NVO mode, resulting in an overall higher in-cylinder gas temperature, more stable combustion, higher combustion efficiency, and fewer emissions. According to an exemplary embodiment, using the NVO to trap the combusted bot gases in the cylinders of the engine system 100 may reduce the engine-out NOx emissions by lowering the combustion peak temperature.

According to an exemplary embodiment, during the warm-up period, the double fuel injections may continue to be used, with one fuel injection occurring during the NVO mode and the other fuel injection occurring after the IVO event, and an ignition source (e.g., a spark plug and/or other suitable ignition source) may be used to initiate the combustion of the fuel-air mixture.

According to an exemplary embodiment, during the warm-up period, spark timing (ST), which may control when the ignition source fires during compression, may be adjusted based on an ST map of the engine system 100 during cold start calibration. According to an exemplary embodiment, when cylinder pressure feedback control is used, the ST may be adjusted based on a comparison of an actual combustion phasing with a target combustion phasing According to an exemplary embodiment, the ST may be delayed when combustion phasing is too advanced, and vice visa (i.e., the ST may be advanced when combustion phasing is too delayed).

According to an exemplary embodiment, during the warm-up period, the NVO amount may be adjusted based on an NVO map of engine cold start calibration. According to an exemplary embodiment, when cylinder pressure feedback control is used, the NVO may be adjusted by checking if the ST is out of a preset operating window. According to an exemplary embodiment, the NVO amount may be reduced when the ST is above a preset max (e.g., the ST is too delayed), and/or the NVO amount may be increases when the ST is below a preset min (e.g., the ST is too advanced).

According to an exemplary embodiment, during the warm-up period, the engine system 100 may be run with a relatively advanced combustion phasing (e.g., with approximately a 20-50 degree crank angle after firing top dead center, instead of approximately a 60-80 degree crank angle after firing top dead center as in conventional spark ignited engines, for more stable and complete combustion, and the engine system 100 may be configured to use an early exhaust valve open (EVO) timing to increase exhaust temperature for speedily/readily achieving the catalytic light-off temperature.

According to an exemplary embodiment, during the warm-up period, with a late IVO, the engine system 100 may use a relative early intake valve close (IVC) timing to create an NVO amount. This may result in a relatively higher effective compression ratio to better prepare a fuel-air mixture thermodynamically for more complete and stable combustion.

According to an exemplary embodiment, the engine system 100 may be run with a globally lean fuel:air ratio such that there may be some extra oxygen available for unburnt HC/CO oxidations, and also for fuel chemical reactions when fuel is injected during the NVO mode.

Figure 2:
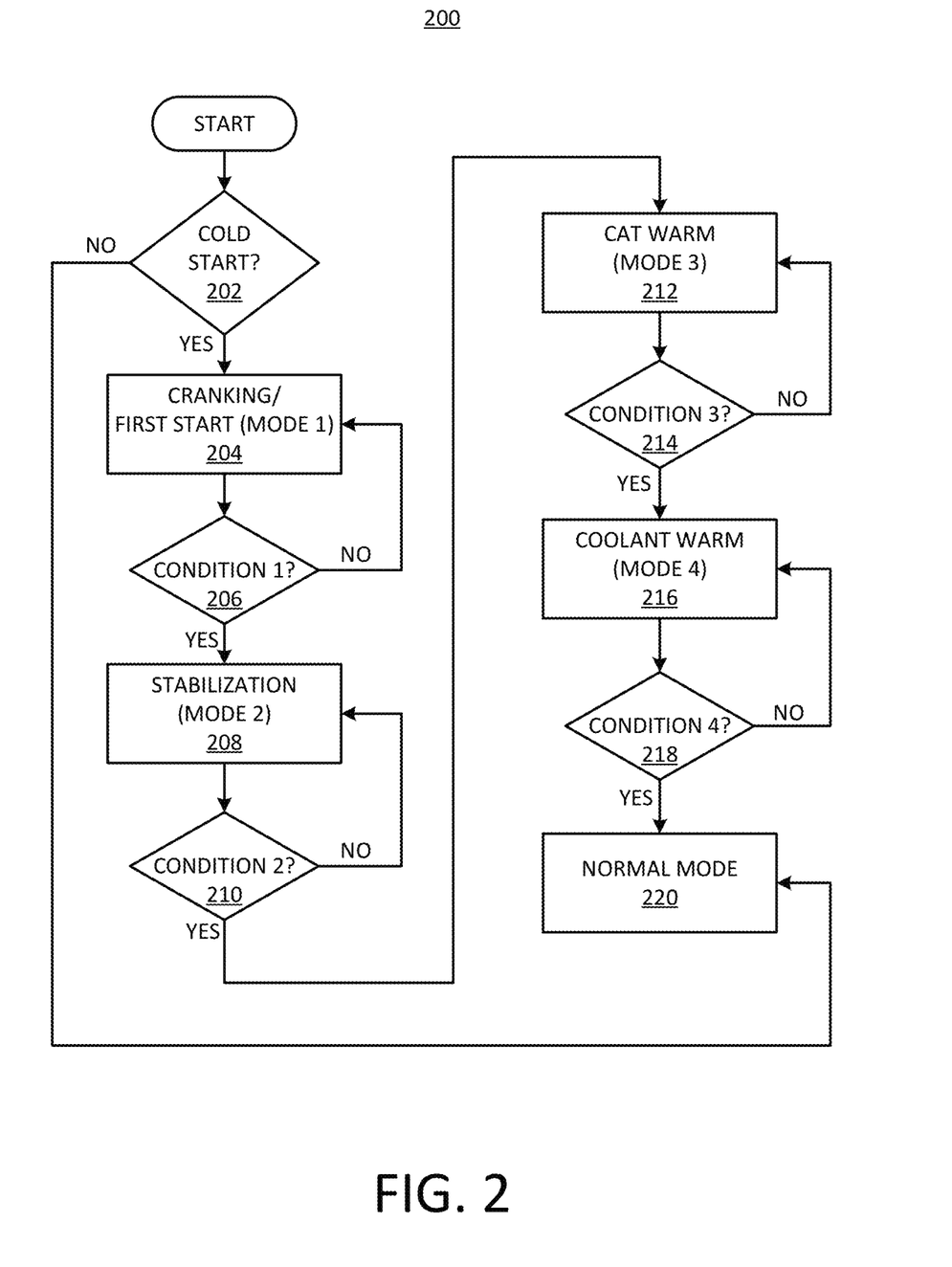
FIG. 2 illustrates a method for reducing engine-out emissions during an engine cold start, according to an exemplary embodiment of the present disclosure.

Referring now to FIG. 2, a method 200 for reducing engine-out emissions during an engine cold start is illustratively depicted, in accordance with an exemplary embodiment of the present disclosure.

At 202, it is determined whether an engine system is performing a cold start. According to an exemplary embodiment, when the engine system is not performing a cold start, then, at 220, the engine system is run in a normal mode. According to an exemplary embodiment, when the engine system is performing a cold start, then, at 204, a cranking/first start mode (Mode 1) is performed.

According to an exemplary embodiment, during Mode 1, either an NVO amount or a conventional spark ignition (SI) camshaft setting (cam setting) (e.g., a minimum NVO or PVO amount) may be incorporated/used. According to an exemplary embodiment, if the NVO amount is used, an actual NVO amount may be determined based on a vehicle test. According to an exemplary embodiment, the NVO duration amount may be configured such that an internal exhaust gas recirculation (EGR) ratio may enhance fuel vaporization while maintaining an acceptable combustion stability. According to an exemplary embodiment, NVO duration may be approximately 80-120 crank angle degree (CAD) after top dead center firing (aTDCf). It is noted, however, that other NVO durations may be incorporated, while maintaining the spirit and functionality of the present disclosure.

At 206, it is determined whether Condition 1, in which the engine system has performed a successful start, has been met According to an exemplary embodiment, when Condition 1 has not been met, then Mode 1, at 204, is performed. According to an exemplary embodiment, when Condition 1 has been met, then, at 208, a stabilization mode (Mode 2) is performed.

According to an exemplary embodiment, during Mode 2, either an NVO amount or a conventional SI cam setting (e.g., a minimum NVO or PVO amount) may be incorporated/used. According to an exemplary embodiment, if the NVO amount is used, an actual NVO amount may be determined based on a vehicle test. According to an exemplary embodiment, the NVO duration amount may be configured such that an internal EGR ratio may enhance fuel vaporization while maintaining an acceptable combustion stability.

According to an exemplary embodiment, during Mode 2, the engine system may be run with a relatively advanced combustion phasing (e.g., with approximately a 20-50 CAD aTDCf, instead of approximately a 60-80 CAD aTDCf as in conventional SI engines, for more stable and complete combustion.

At 210, it is determined whether Condition 2, in which stable combustion has been met without misfiring, has been met. According to an exemplary embodiment, when Condition 2 has not been met, then Mode 2, at 208, is performed. According to an exemplary embodiment, when Condition 2 has been met, then, at 212, a catalytic brick warm (Cat Warm) mode (Mode 3) is performed.

According to an exemplary embodiment, during Mode 3, the engine system may be configured to use an early exhaust valve open (EVO) timing to increase exhaust temperature for speedily/readily achieving the catalytic light-off temperature. According to an exemplary embodiment, for early EVO, EVO timing may be advanced for higher exhaust temperature. According to an exemplary embodiment, an early EVO duration may be approximately 90-120 CAD aTDCf. It is noted, however, that other early EVO durations may be incorporated, while maintaining the spirit and functionality of the present disclosure.

According to an exemplary embodiment, during Mode 3, the engine system may be configured to run with a globally lean fuel:air ratio such that there may be some extra oxygen available for unburnt HC/CO oxidations, and also for fuel chemical reactions when fuel is injected during the NVO mode. According to an exemplary embodiment, during Mode 3, the engine system may be configured to run a lean operation, where an air:fuel equivalence ratio ($\lambda$) has a standard range of 1.01-1.40, where $\lambda$ is a ratio of an actual air:fuel ratio to a stoichiometric air:fuel ratio. It is noted, however, that other $\lambda$ values may be incorporated, while maintaining the spirit and functionality of the present disclosure.

According to an exemplary embodiment, during Mode 3, the engine system may be run with the proposed cold-start strategy until the target conditions are met (e.g., the catalyst brick reaches its light-off temperature).

At 214, it is determined whether Condition 3, in which a target catalyst brick temperature has been reached, has been met. According to an exemplary embodiment, when Condition 3 has not been met, then Mode 3, at 212, is performed. According to an exemplary embodiment, when Condition 3 has been met, then, at 216, a coolant warm mode (Mode 4) is performed.

According to an exemplary embodiment, during Mode 4, the engine system may be run with the proposed cold-start strategy until the target conditions are met (e.g., the coolant reaches a target temperature).

According to an exemplary embodiment, at 218, it may be determined whether Condition 4, in which a target coolant temperature has been reached, has been met. According to an exemplary embodiment, when Condition 4 has not been met, then Mode 4, at 216, is performed. According to an exemplary embodiment, when Condition 4 has been met, then, at 220, then the engine system is run in a normal mode.

Figure 3:
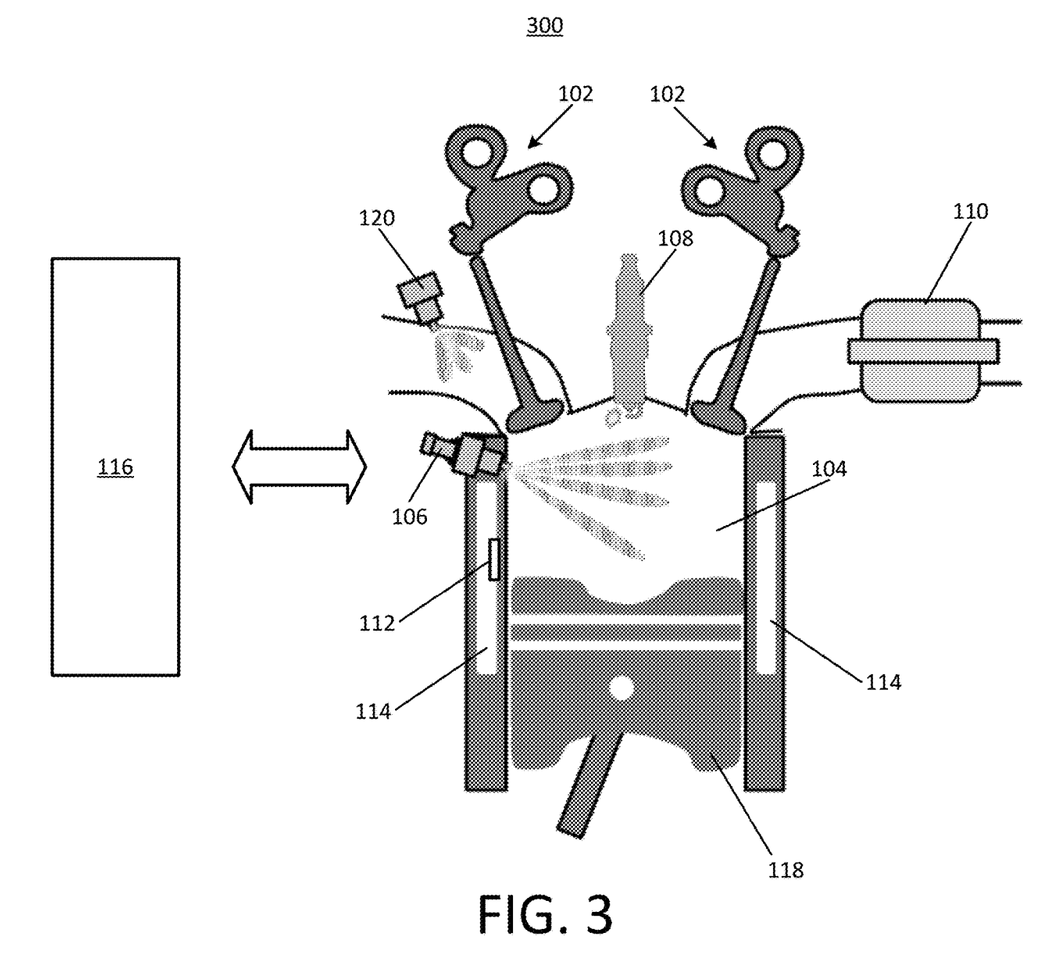
FIG. 3 illustrates an engine system configured to reduce engine-out emissions during an engine cold start, according to an exemplary embodiment of the present disclosure.

Referring now to FIG. 3, an engine system 300 configured to reduce engine-out emissions during an engine cold start is illustratively depicted, in accordance with an exemplary embodiment of the present disclosure.

The engine system 300 may be an internal combustion engine system. According to an exemplary embodiment, similar to engine system 100, the engine system 300 may comprise one or more dual CVVD and CVVT mechanisms 102 for the intake and exhaust valve systems, one or more combustion chambers 104, one or more pistons 118, one or more ignition systems 108, one or more aftertreatment monitoring systems 110 (e.g., one or more catalytic brick temperature monitoring systems and/or one or more other suitable aftertreatment monitoring systems), one or more engine coolant temperature sensors 112, and/or one or more water jackets 114, among other suitable components. According to an exemplary embodiment, the one or more engine coolant temperature sensors 112 may be coupled to one or more water jackets 114.

According to an exemplary embodiment, the engine system 300 may comprise an engine controller 116 configured to control one or more components and/or functions of the engine system 300. According to an exemplary embodiment, the engine controller 116 may be in electronic communication with one or more components of the engine system 300. The engine controller 116 may be in electronic communication with the one or more components of the engine system 300 via a wired and/or wireless connection such as, for example, through the cloud.

According to an exemplary embodiment, the engine system 300 may comprise one or more GDI systems 106 and/or one or more port fuel injection delivery systems 120. According to an exemplary embodiment, the engine system 300 may be configured to use the port fuel injection system 120 instead of direct fuel injection, or may be configured to use a combination of both, as shown, e.g., in FIG. 3.

According to an exemplary embodiment, the engine system (e.g., engine systems 100, 300) may be configured to run with a globally stoichiometric fuel-air ratio. According to an exemplary embodiment, the engine system may be configured to start without an NVO as a conventional SI engine, and then use an NVO mode during a warm-up period of the engine.

According to an exemplary embodiment, the engine system (e.g., engine systems 100, 300) may be configured to perform single fuel injection, which may start during the NVO, during an intake stroke (at or after IVO), or during a compression stroke (at/after IVC). According to an exemplary embodiment, the engine system may be configured to perform double fuel injection with both injections starting during the NVO or both after NVO. According to an exemplary embodiment, the engine system may be configured to perform triple fuel injection, with one injection during NVO, a second injection after IVO but before firing top dead center, and the 3rd injection aTDCf.

Figure 4:
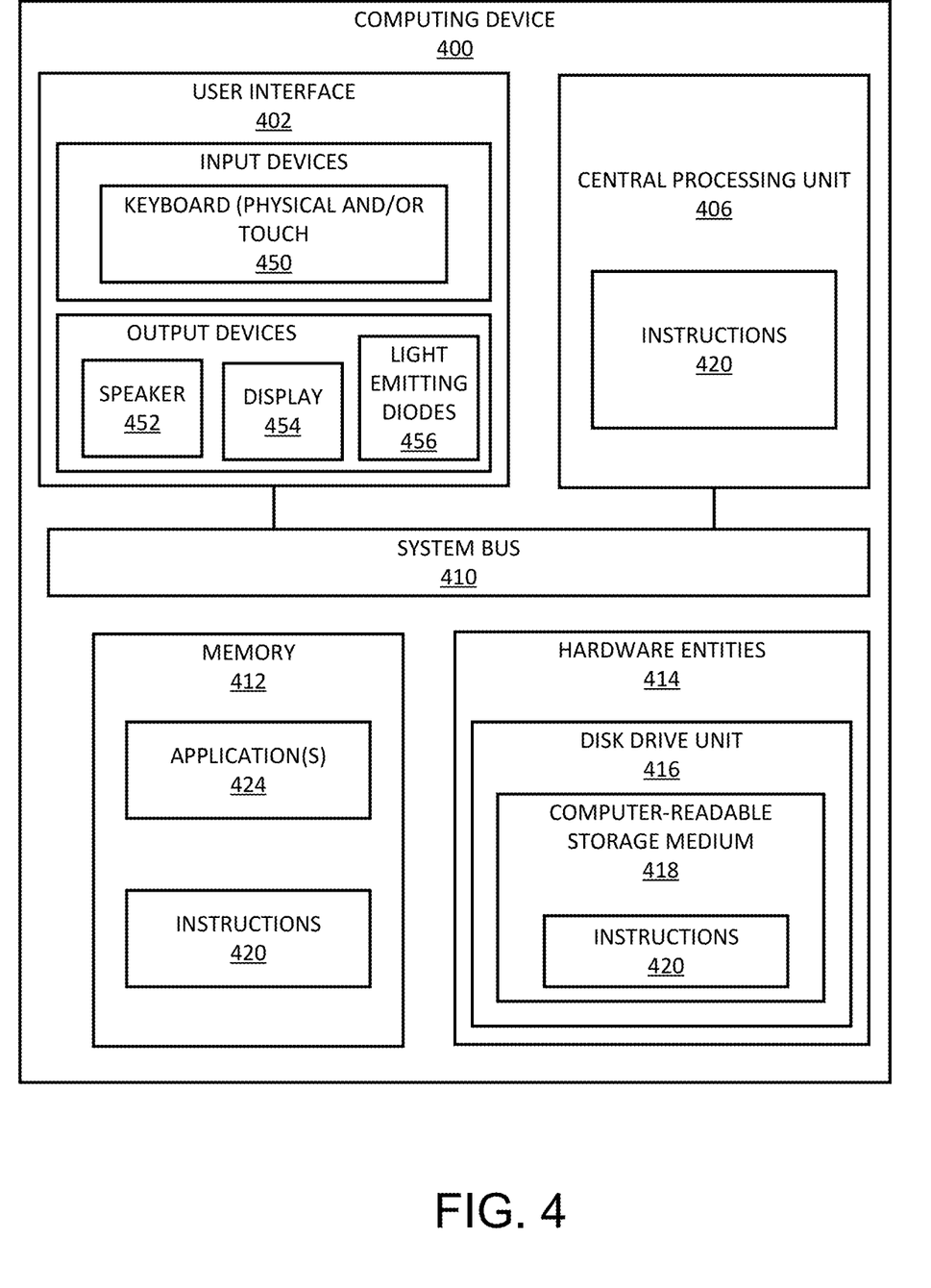
FIG. 4 illustrates example elements of a computing device, according to an exemplary embodiment of the present disclosure.

Referring now to FIG. 4, an illustration of an example architecture for a computing device 400 is provided. According to an exemplary embodiment, one or more functions of the present disclosure may be implemented by a computing device such as, e.g., computing device 400 or a computing device similar to computing device 400.

The hardware architecture of FIG. 4 represents one example implementation of a representative computing device configured to perform one or more methods and means for reducing engine-out emissions during an engine cold start, as described herein. As such, the computing device 400 of FIG. 4 may be configured to implement at least a portion of the method(s) described herein (e.g., method 200 of FIG. 2) and/or implement at least a portion of the functions of the system(s) described herein (e.g., engine system 100 of FIG. 1 and engine system 300 of FIG. 3).

Some or all components of the computing device 400 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 4, the computing device 400 may comprise a user interface 402, a Central Processing Unit ("CPU") 406, a system bus 410, a memory 412 connected to and accessible by other portions of computing device 400 through system bus 410, and hardware entities 414 connected to system bus 410. The user interface may comprise input devices and output devices, which may be configured to facilitate user-software interactions for controlling operations of the computing device 400. The input devices may comprise, but are not limited to, a physical and/or touch keyboard 440. The input devices may be connected to the computing device 400 via a wired or wireless connection (e.g., a Bluetooth® connection). The output devices may comprise, but are not limited to, a speaker 442, a display 444, and/or light emitting diodes 446.

At least some of the hardware entities 414 may be configured to perform actions involving access to and use of memory 412, which may be a Random Access Memory (RAM), a disk driver and/or a Compact Disc Read Only Memory (CD-ROM), among other suitable memory types. Hardware entities 414 may comprise a disk drive unit 416 comprising a computer-readable storage medium 418 on which may be stored one or more sets of instructions 420 (e.g., programming instructions such as, but not limited to, software code) configured to implement one or more of the methodologies, procedures, or functions described herein. The instructions 420 may also reside, completely or at least partially, within the memory 412 and/or within the CPU 406 during execution thereof by the computing device 400.

The memory 412 and the CPU 406 may also constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
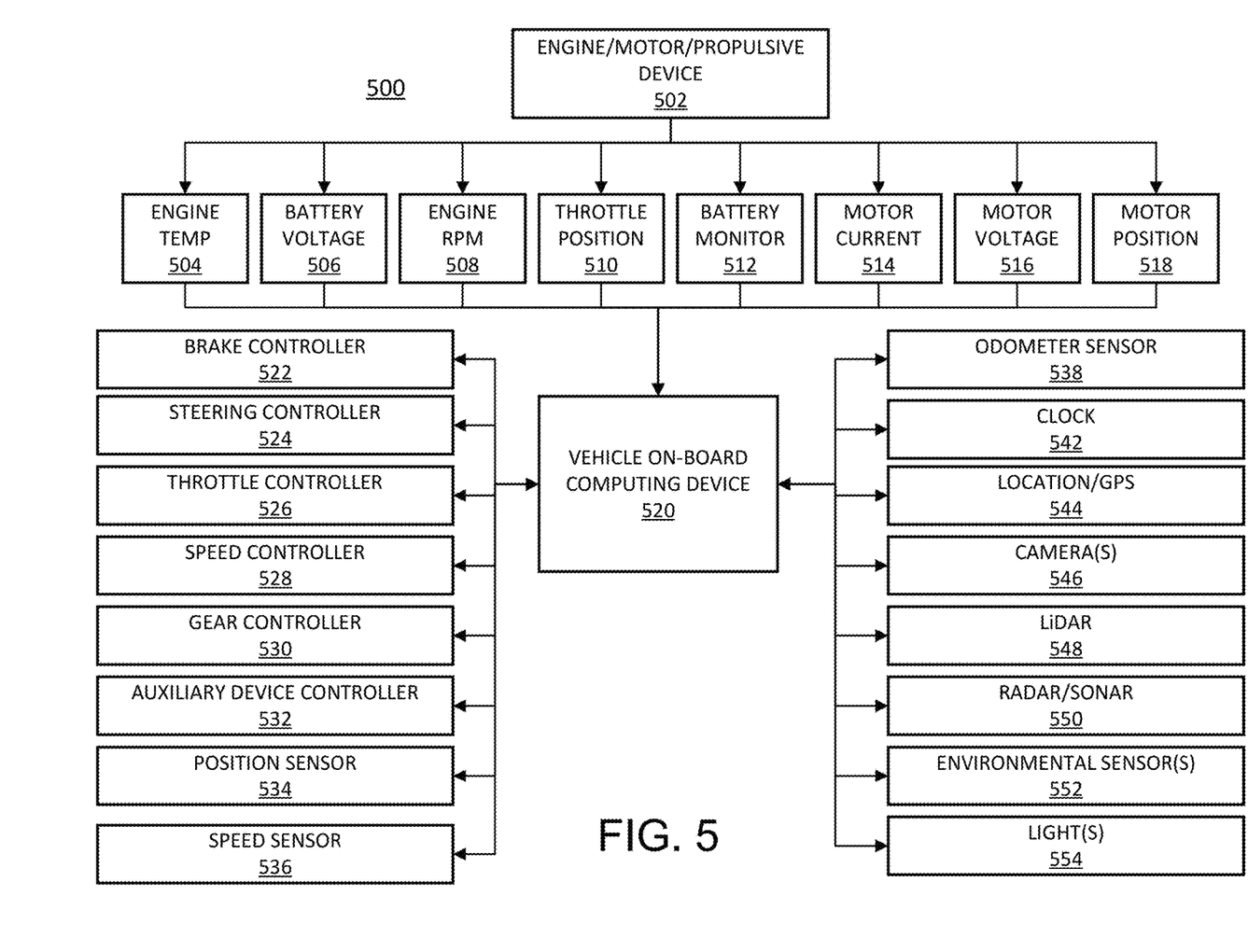
FIG. 5 illustrates an example architecture of a vehicle, according to an exemplary embodiment of the present disclosure.

Referring now to FIG. 5, an example vehicle system architecture 500 for a vehicle is provided, in accordance with an exemplary embodiment of the present disclosure.

Engine system 100 and engine system 300 may be configured to be incorporated in or with a vehicle having the same or similar system architecture as that shown in FIG. 5. Thus, the following discussion of vehicle system architecture 500 is sufficient for understanding one or more components of a vehicle with which engine systems 100 and 300 may be incorporated.

As shown in FIG. 5, the vehicle system architecture 500 may comprise an engine, motor or propulsive device (e.g., a thruster) 502 and various sensors 504-518 for measuring various parameters of the vehicle system architecture 500. In gas-powered or hybrid vehicles having a fuel-powered engine, the sensors 504-518 may comprise, for example, an engine temperature sensor 504, a battery voltage sensor 506, an engine Rotations Per Minute (RPM) sensor 508, and/or a throttle position sensor 510. If the vehicle is an electric or hybrid vehicle, then the vehicle may comprise an electric motor, and accordingly may comprise sensors such as a battery monitoring system 512 (to measure current, voltage and/or temperature of the battery), motor current 514 and voltage 516 sensors, and motor position sensors such as resolvers and encoders 518.

Operational parameter sensors that are common to both types of vehicles may comprise, for example: a position sensor 534 such as an accelerometer, gyroscope and/or inertial measurement unit, a speed sensor 536; and/or an odometer sensor 538. The vehicle system architecture 500 also may comprise a clock 542 that the system uses to determine vehicle time and/or date during operation. The clock 542 may be encoded into the vehicle on-board computing device 520, it may be a separate device, or multiple clocks may be available.

The vehicle system architecture 500 also may comprise various sensors that operate to gather information about the environment in which the vehicle is traveling. These sensors may comprise, for example: a location sensor 544 (for example, a Global Positioning System (GPS) device); object detection sensors such as one or more cameras 546; a LIDAR sensor system 548; and/or a RADAR and/or a sonar system 550. The sensors also may comprise environmental sensors 552 such as, e.g., a humidity sensor, a precipitation sensor, a light sensor, and/or ambient temperature sensor. The object detection sensors may be configured to enable the vehicle system architecture 500 to detect objects that are within a given distance range of the vehicle in any direction, while the environmental sensors 552 may be configured to collect data about environmental conditions within the vehicle's area of travel. According to an exemplary embodiment, the vehicle system architecture 500 may comprise one or more lights 554 (e.g., headlights, flood lights, flashlights, etc.).

During operations, information may be communicated from the sensors to an on-board computing device 520 (e.g., computing device 400 of FIG. 4). The on-board computing device 520 may be configured to analyze the data captured by the sensors and/or data received from data providers and may be configured to optionally control operations of the vehicle system architecture 500 based on results of the analysis. For example, the on-board computing device 520 may be configured to control: braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); and/or other controllers. The brake controller 522 may comprise a pedal effort sensor, pedal effort sensor, and/or simulator temperature sensor, as described herein.

Geographic location information may be communicated from the location sensor 544 to the on-board computing device 520, which may then access a map of the environment that corresponds to the location information to determine known fixed features of the environment such as streets, buildings, stop signs and/or stop/go signals. Captured images from the cameras 546 and/or object detection information captured from sensors such as LIDAR 548 may be communicated from those sensors to the on-board computing device 520. The object detection information and/or captured images may be processed by the on-board computing device 520 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method of reducing engine cold start emissions, comprising:
   during an engine cranking period:
      performing a negative valve overlap (NVO) mode of operation, using an early exhaust valve closing (EVC) timing that creates an NVO during a gas exchange top dead center, to compress in-cylinder gas and increase overall gas temperature for improved fuel vaporization before a fuel-air mixture is burnt.

2. The method of claim 1, further comprising:
   during an engine stabilization period:
      performing the NVO mode of operation, using the early EVC timing that creates the NVO during the gas exchange top dead center, to trap hot burnt gas in a cylinder and increase overall gas temperature for improved fuel vaporization before the fuel-air mixture is burnt.

3. The method of claim 2, further comprising:
   during an engine warm-up period:
      performing the NVO mode of operation, using the early EVC timing that creates the NVO during the gas exchange top dead center, to trap hot burnt gas in the cylinder and increase overall gas temperature for improved fuel vaporization before the fuel-air mixture is burnt.

4. The method according to claim 3, wherein, during the engine warm-up period, performing the NVO mode of operation comprising using a globally lean fuel-air ratio.

5. The method according to claim 3, wherein, during the engine warm-up period, performing the NVO mode of operation comprising using a stoichiometric fuel-air ratio.

6. A system of reducing engine cold start emissions, comprising:
   an internal combustion engine system, comprising:
      an engine chamber with a piston;
      one or more of the following, configured to enable a negative valve overlap (NVO) mode of operation in which an intake valve opening (IVO) timing is later than an exhaust valve closing (EVC) timing:
         a continuously variable valve duration (CVVD) mechanism for both an intake valve and an exhaust valve;
         a dual CVVD and continuously variable valve timing (CVVT) mechanism for both the intake valve and the exhaust valve; and
         a cam system;
      a fuel delivery system comprising one or more of the following:
         a direct injector; and
         a port fuel injector; and
      an ignition system; and
   a computing device, comprising a processor and a memory, configured to store programming instructions that, when executed by the processor, cause the processor to:
      perform the NVO mode of operation, with an NVO during a gas exchange top dead center, to trap hot burnt gas in a cylinder and increase overall gas temperature for improved fuel vaporization before a fuel-air mixture is burnt; and
      perform one or more of:
         a double fuel injection with a first fuel injection and a second fuel injection being performed during the NVO mode of operation;
         a double fuel injection with the first injection taking place during the NVO mode of operation and the second fuel injection taking place after an intake valve opening (IVO) timing is later than the EVC timing; and
         a triple fuel injection, with the first fuel injection taking place during the NVO mode of operation, the second fuel injection taking place before firing Top Dead Center (TDCf), and the third fuel injection taking place after TDCf.

7. The system of claim 6, wherein the internal combustion engine system further comprises one or more catalytic brick temperature monitoring systems including a rocessor.

8. The system of claim 6, wherein the internal combustion engine system further comprises:
   one or more engine coolant temperature sensors; and
   one or more water jackets.

9. The system of claim 8, wherein the one or more engine coolant temperature sensors are coupled to the one or more water jackets.

10. The system of claim 6, wherein the internal combustion engine system further comprises an engine controller configured to control one or more functions of the internal combustion engine system.

11. The system of claim 10, wherein the programming instructions, when executed by the processor, are configured to cause the engine controller to control the one or more functions of the internal combustion engine system.

12. A vehicle comprising a system of claim 6.

* * * * *